Nov. 10, 1964
R. C. DARNELL
3,156,119
DIFFERENTIAL PRESSURE INDICATOR
Filed Feb. 13, 1962
3 Sheets-Sheet 1
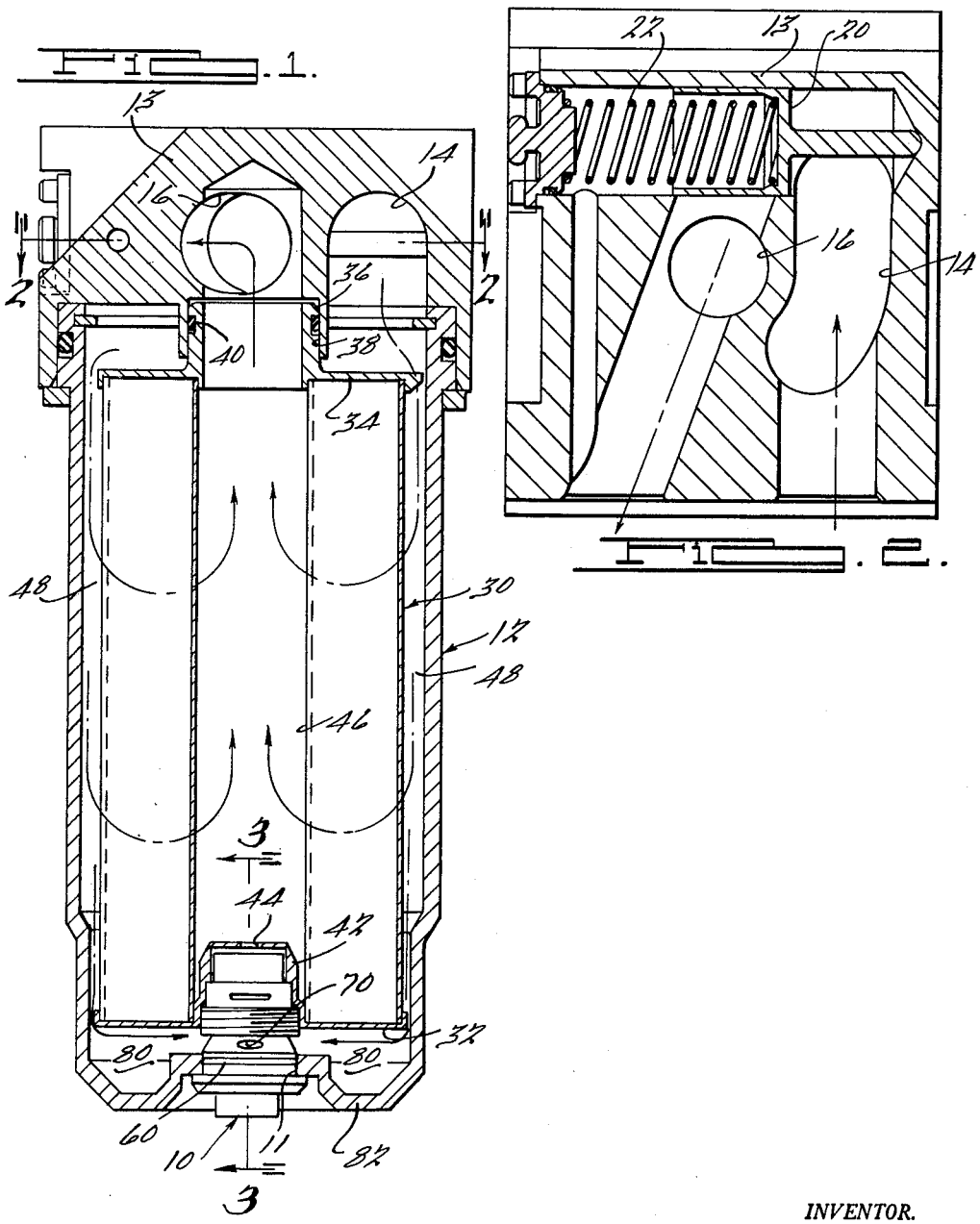
INVENTOR.
Rex C. Darnell
BY
Harness, Dickey & Pierce
ATTORNEYS

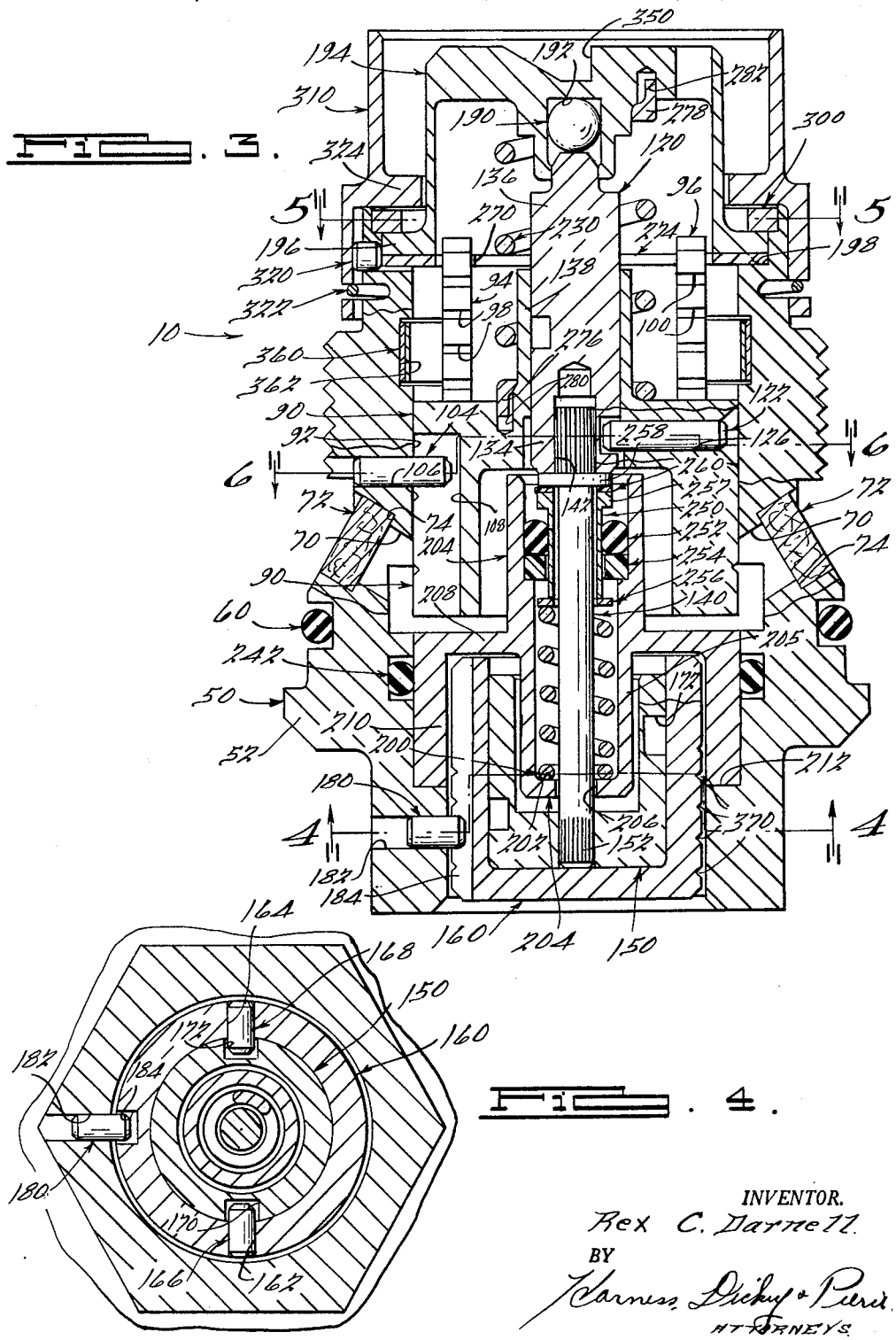

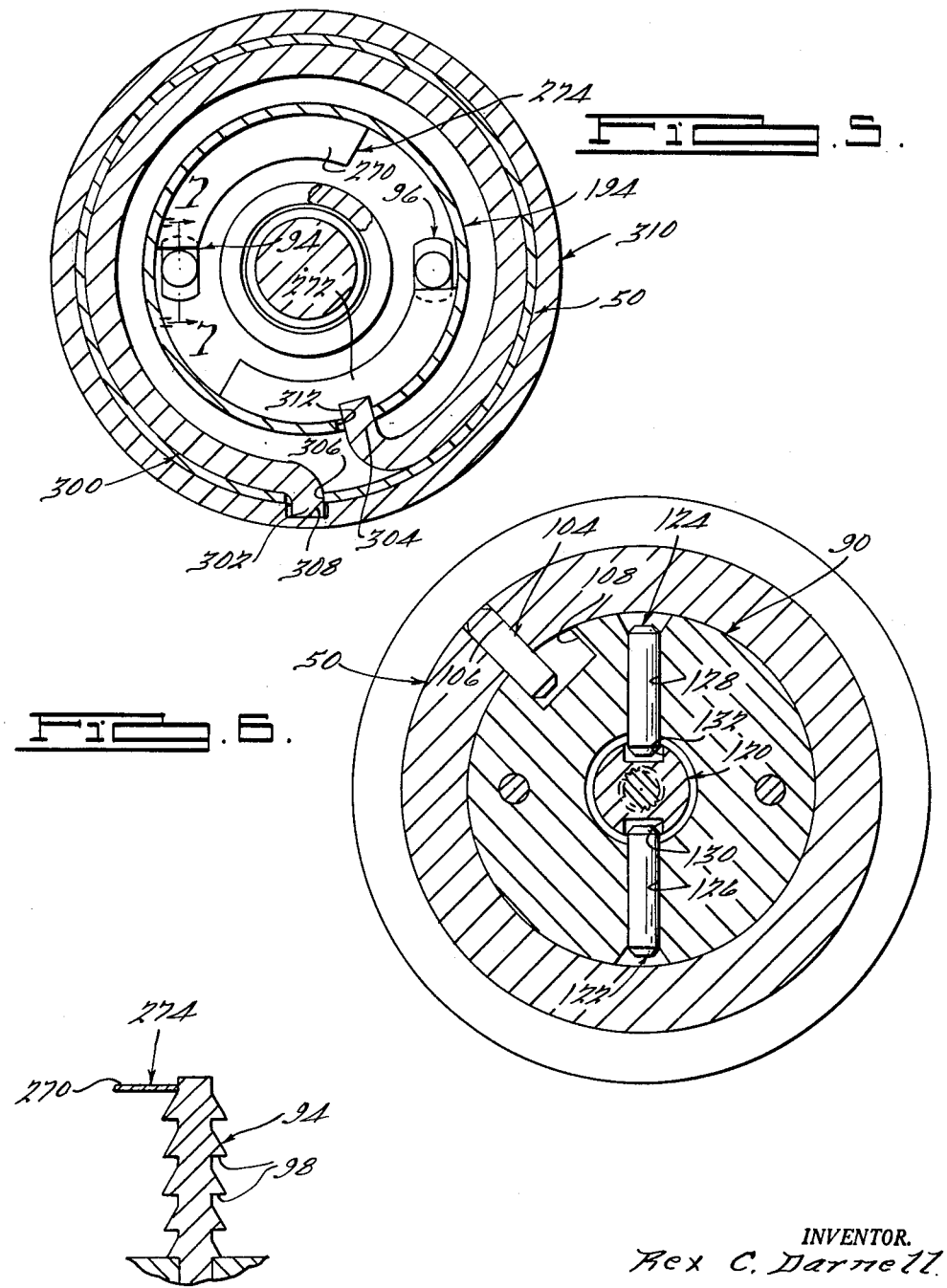

United States Patent Office 3,156,119
Patented Nov. 10, 1964

3,156,119
DIFFERENTIAL PRESSURE INDICATOR
Rex C. Darnell, Dexter, Mich., assignor, by mesne assignments, to Michigan-Dynamics, Inc., Detroit, Mich., a corporation of Michigan
Filed Feb. 13, 1962, Ser. No. 172,977
3 Claims. (Cl. 73—407)

This invention relates generally to pressure indicators and more particularly to an improved differential pressure indicator of the type used in, for example, airborne hydraulic systems.

Differential pressure indicators have particular application in aircraft hydraulic circuits where a high value of differential pressure is an indication of potential trouble. However, in order for a differential pressure indicator to be suitable for use in an aircraft hydraulic system, it must exhibit a number of characteristics peculiar to such an application. For example, the differential pressure indicator should preferably give a warning signal or other advance notice as to when a pre-set pressure differential level will be achieved.

Differential pressure indicators heretofore known and used generally are provided with indicator buttons of a "pop out" type, i.e., visual or electrical indication accomplished at only a pre-set differential pressure level.

Another desirable feature of a differential pressure indicator is that after a high differential pressure is sensed, it cannot be easily re-set without carrying out the necessary maintenance of the fluid system as called for by the high differential pressure.

Yet another attribute of a differential pressure indicator is that it be relatively small and self-contained so as to be capable of integration with other devices such as filters, relief valves, etc.

Preferably, a differential pressure indicator does not utilize sliding-type rubber O-ring seals, either in the actuating motor or in the indicating mechanism, which seals exhibit variable friction characteristics as a function of the temperature and type of fluid, age, etc., reducing the accuracy of the differential pressure indicator upon repeated actuation.

In many hydraulic circuits, it is common to experience high differential pressures during start-up of the system where the fluid is cold and quite viscous. High differential pressures under these conditions are not necessarily indicative of pending trouble and are reduced appreciably once the hydraulic fluid in the system has warmed up to operating temperatures. It is therefore desirous to restrict activation of the indicator due to high differential pressures at low temperatures. It has heretofore been proposed to incorporate a low temperature "lock out" mechanism to satisfy this requirement. However, such a "lock out" mechanism must sense the temperature of the system fluid as well as the ambient temperature at the indicator in order to give protection in situations where the ambient temperature remains at a low level while operating fluid temperature increases.

Preferably, a differential pressure indicator does not utilize permanent magnets which, when used in a contaminated fluid system such as is encountered in many applications, actually serve to draw foreign particles from the system to the indicator, thereby resulting in premature malfunction of the closely fitting moving parts.

A differential pressure indicator in accordance with the instant invention meets the foregoing requirements to a heretofore unknown degree since it gives positive indication of the level of differential pressure, cannot be reset without material disassembly of the hydraulic system attendant to servicing, does not utilize sliding O-rings, is compensated for fluid as well as ambient temperatures, and not utilize permanent magnets with their inherent collateral limitations.

Accordingly, one object of the present invention is an improved differential pressure indicator.

Another object is a differential pressure indicator that gives advance warning of an impending deleterious differential pressure in a fluid circuit.

Another object is a differential pressure indicator that gives visual indication of the degree of differential pressure in a fluid circuit.

Another object is a differential pressure indicator that cannot be reset without servicing a fluid circuit containing the indicator.

Another object is a differential pressure indicator that is relatively small and self-contained so as to be capable of integration in, for example, filters, relief valves, etc.

Another object is a differential pressure indicator that does not utilize sliding O-ring seals.

Another object is a differential pressure indicator having relatively consistent internal friction characteristics.

Another object is a differential pressure indicator that is not spuriously activated due to low ambient temperature conditions in the fluid circuit.

Another object is a differential pressure indicator that does not require the use of permanent magnets.

Other objects and advantages of the instant invention will become apparent from a study of the following specification, claims and drawings, wherein:

FIGURE 1 is a sectional elevation of a fluid filter having a differential pressure indicator in accordance with the instant invention in operative association therewith;

FIG. 2 is a cross-sectional view taken substantially along the line 2—2 of FIGURE 1;

FIG. 3 is a cross-sectional view taken substantially along the line 3—3 of FIGURE 1;

FIG. 4 is a cross-sectional view taken substantially along the line 4—4 of FIG. 3;

FIG. 5 is a cross-sectional view taken substantially along the line 5—5 of FIG. 3;

FIG. 6 is a cross-sectional view taken substantially along the line 6—6 of FIG. 3; and FIG. 7 is a cross-sectional view taken substantially along the line 7—7 of FIG. 5.

A differential pressure indicator in accordance with an exemplary embodiment of the instant invention, comprises a pair of screws mounted on a common shaft with two separate screw nuts at either end of the shaft. Rotary motion of both screw nuts is limited and hence the linear motion of one of the nuts is transmitted into rotary motion of the shaft and hence linear motion of the other nut.

As best seen in FIGURE 1 of the drawings, a differential pressure indicator 10, in accordance with an exemplary embodiment of the instant invention, is mounted in a complementary aperture 11 in a filter housing 12. The filter housing 12 has an upper end closure 13 with inlet and outlet apertures 14 and 16, respectively. The upper end closure 13 has a high-pressure, piston-type relief valve 20 therein that is normally biased to a closed position by a helical compression spring 22.

A conventional fluid filter 30 is disposed within the filter housing 12. The filter 30 has a lower end cap 32 and an upper end cap 34. The upper end cap 34 has an upwardly extending annular flange 36 thereon that is sealably accepted in a downwardly opening bore 38 in the upper end closure 13.

A static O-ring 40 is disposed between the flange 36 and bore 38 to effect a fluid seal therebetween, thereby insuring that fluid passes through the filter element 30 in order to complete a fluid circuit between the inlet and outlet apertures 14 and 16, respectively. The lower end cap 32 of the filter 30 has an upwardly extending downwardly opening, cup-like center portion 42 with a central aperture 44 therein. The aperture 44 provides for a fluid communicating relationship between the low-pressure fluid reservoir 46 disposed centrally of the filter 30 and the differential pressure indicator 10.

A high-pressure reservoir 48 is defined by the filter housing 12 and the filter 30 is fluid-communicating relationship with the inlet aperture 14 in the upper end closure 13.

As best seen in FIG. 3, the differential pressure indicator 10 comprises a housing 50 having a flange portion 52 adapted to position the indicator 10 axially of the complementary aperture 11 in the filter housing 12. A conventional static O-ring 60 seals the differential pressure indicator 10 within the aperture 11 of the housing 12.

A series of radial holes 70 extend through the housing 50 to provide a fluid circuit therethrough. The holes 70 are covered with felt plugs 72 which are secured in complementary seats 74 as by a suitable epoxy resin. The function of the felt plugs 72 is to act as a filter media for the small amount of fluid that flows into the differential pressure indicator 10. The series of holes 70 and felt plugs 72 are in registry with an annulus 80 defined between the lower cap 32 of the filter 30 and a lower end 82 of the housing 12 (FIGURE 1). The annulus 80 is in fluid communicating relationship with the inlet 14 and is therefore supplied with fluid at relatively high inlet pressures.

The pressure differential occurring across the filter 30 also exists across the differential pressure indicator 10. Thus, the differential pressure indicator indicates the existence of a dirty filter, which inherently results in a relatively large pressure differential.

As best seen in FIG. 3, a piston 90 is fitted in close slidable relationship within an internal bore 92 of the housing 50 and is movable axially thereof under the influence of fluid pressure. The piston 90 constitutes one of the aforementioned screw nuts. A pair of latch pins 94 and 96 are secured to the piston 90, having a plurality of ratchet shoulders 98 and 100 thereon, respectively, the function of which will be discussed hereinafter.

Rotation of the piston 90 within the bore 92 of the housing 50 is limited by a pin 104 that is permanently supported in a bore 106 in the housing 50 and registers an axial slot 108 in the piston 90.

Radially inwardly from the piston 90 is a piston screw 120 which constitutes the upper end, as seen in FIG. 3, of the aforementioned basic shaft which, in actual practice, has been separated into several pieces to facilitate assembly. A pair of pins 122 and 124 (FIG. 6) are mounted in press-fit relationship in complementary bores 126 and 128 in the piston 90 and extend into slidable registry with double square threads 130 and 132 in the piston screw 120. The square threads 130 and 132 are cut into only lower end portions 134 of the piston screw 120, an upper end portion 136 of the screw 120 being of smooth circular cross section so as to be slidable within a skirt portion 138 of the piston 90 to provide a pressure seal from one side of the piston 90 to the other.

In fixed rotational relationship with the screw 120 is an actuating rod 140 which is secured to the screw 120, as by splines 142. The rod 140 is also secured to a lower screw 150 as by splines 152. The upper piston screw 120, rod 140, and lower screw 150 constitute the basic screw shaft previously mentioned and are made in separate pieces only to facilitate assembly of the differential pressure indicator 10.

An indicating button 160 constitutes the other major screw nut previously described. Incorporated in the indicator button 160 in press-fit relationship in a pair of bores 162 and 164 therein, are a pair of pins 166 and 168, respectively, which are slidably engaged in double square threads 170 and 172 in the lower screw 156 (FIG. 4). The indicator button 160 is free to slide axially in the housing 50, rotary movement thereof being limited by a pin 180 that is accepted in press-fit relationship in a bore 182 in the housing 50 in registry with a slot 184 in the indicator button 160.

From the foregoing description, it should be apparent that axial movement of the piston 90, due to fluid pressure sensed through the aperture 70 in the housing 50, will produce rotation of the upper screw 120, rod 140 and lower screw 150 which, in turn, produces axial movement of the indicator button 160.

In order to achieve proper operation of the basic system, it is necessary only to prevent axial movement of the upper screw 120, rod 140 and lower screw 150. Then, by selecting either the same or oppositely directed helixes in the upper and lower screws 120 and 150, the piston 90 and button 160 can be made to travel axially in either the same or opposite directions during operation.

Axial movement of the upper screw 120 is prevented by abutting one end thereof against a ball 190 which is seated in a recess 192 in an end cap 194. The end cap 194 is maintained in a fixed axial relationship with respect to the housing 50 by a flange 196 thereof that is seated on an annular shoulder 198 on the housing 50.

A constant upward force is exerted on the rod 140 and upper screw 120 toward the ball 190 by a helical compression spring 200, a lower end of which is supported in a recess 202 in an annular seal housing 204. The seal housing 204 has a tubular inner portion 205 with an aperture 206 therein for the acceptance of the rod 140. A radial flange 208 extends radially outwardly from the upper end of the tubular portion 205. An annular flange 210 extends downwardly from the radial flange 208 and is seated on an annular shoulder 212 on the housing 50.

A piston spring 230 having a predetermined force displacement characteristic, extends between the axially fixed cap 194 and the axially movable piston 90, so as to provide a variable force to the low pressure side of the piston 90. It can thus be seen that by a proper selection of the piston spring 230, various pressure differentials between the high and low pressure sides of the piston 90 will result in various amounts of axial travel of the piston 90. It can also be seen that for each axial position of the piston, there exists an axial position for the indicator button 160 and that the axial position of the indicator button is therefore a direct function of differential pressure imposed upon the differential pressure indicator 10.

As previously discussed, one inherent disadvantage of differential pressure indicators currently known and used is the use of the elastomer type seals in sliding applications and the unpredictable frictional forces resulting therefrom.

Although several elastomer type seals are used in the differential pressure indicators of the instant invention, they are all employed in a static or non-moving position. For example, the external O-ring seal 60 effects a seal between the high and low system pressures. In addition, an O-ring seal 242 is used between the flange 210 of the seal housing 204 and the housing 50. The seal 242 is provided as a precaution against leakage of system pressure, even though the flange 210 of the seal housing 204 is in press-fit relationship with the housing 50, through the external or ambient portions of the indicator.

A dynamic-type seal assembly is disposed midway between the upper and lower screws 120 and 150 to prevent internal system pressure from escaping to the outside of the differential pressure indicator 10. This seal assembly consists of a metal sleeve 250, a static O-ring seal 252, a nylon backup ring 254, and a thrust transfer washer 256. The sleeve 250 has a flange 257 which mates with a complementary flange 258 on the rod 140. Sandwiched between the flanges 257 and 258 is a Teflon washer 260 which serves to reduce friction to a minimum while at the same time providing a fluid seal without necessitating fine finishes on the flanges 257 and 258. The flanges are maintained in intimate contact with the washer 260 by the force of the aforementioned seal spring 200, which force is transmitted through the thrust transmission washer 256 to the skirt of the seal sleeve 250. In operation, the sealing flange 257 of the sleeve 250 and the flange 258 on the intermediate shaft 140 rotate with respect to each other, the flanges evidencing a very low and constant frictional drag. This drag is maintained at a constant value by selecting the preload of the seal spring 200 to be greater than the forces exerted by the highest anticipated system pressure.

Static sealing is maintained between the metal sleeve 250 and the seal housing 204 by the O-ring 252. The nylon backup ring 254 is utilized to prevent the O-ring 252 from extending along the sealing diameter of the metal sleeve 252 under the influence of fluid pressure and to insure that the effective piston area acted upon by internal system pressure is the inside diameter of the O-ring 252.

Rigidly secured to the piston 90 are the two latch pins 94 and 96 for travel axially therewith. The pins 94 and 96 register with a pair of radially inwardly extending detents 270 and 272, respectively, in a locking plate 274. The piston spring 230, rather than being a simple coil spring, has axial tangs 276 and 278 on each end, which register into complementary holes 280 and 282 in the piston 90 and the end cap 194, respectively. With this arrangement and the proper selection of helix direction of the piston spring 230, the spring 230 is caused to exert a torsional load in addition to its aforementioned axial compressive loading. The result of this torsional loading is such as to rotate the piston 90 clockwise, as seen in FIG. 5, so as to engage the ratchet shoulders 98 and 100 of the latch pins 94 and 96 against the sides of the radially inwardly extending detents 270 and 272 in a latch plate 274. Radial alignment of the aforementioned parts is maintained so that the anti-rotation pin 104 is nearly against one side of the axial slot 108 in the piston 90 simultaneously with full engagement of the latch pin ratchet shoulders 98 and 100 with the latching plate 274.

As the piston 90 begins to move under the influence of a differential pressure thereacross, the inclined side of the first ratchet shoulders 98 and 100 on the pins 94 and 96, respectively, bear against the edges of the detents 270 and 272 on the locking plate 274. Contact at this point imparts an additional resistance to axial movement of the piston 90 under the influence of the differential pressure signal, the other resistance to movement being imparted by axial loading of the piston spring 230. In order for movement of the piston 90 to continue, it must rotate counterclockwise, as seen in FIG. 5, as the inclined surfaces of the latch pins 94 and 96 contact the latch plate 274.

As seen in FIG. 6, the width of the slot 108 in the piston 90 is sufficient to permit the aforesaid counterclockwise rotation of the piston 90. However, since the torsional loading of the piston spring 230 must be overcome, there is an ever-increasing amount of resistance to axial movement of the piston through the action of the latch pins 94 and 96 riding against the locking plate 274. Once axial travel of the piston 90 is sufficient so that the shoulders 98 and 100 on the latch pins 94 and 96 register with the latch plate 274, the axial force required to effect torisonal loading of the piston spring 230 is immediately removed, and the spring 230 rotates the piston 90 to engage the lowermost shoulders 98 and 100 of the latch pins 94 and 96 behind the latch plate 274. It can be seen that the resultant movement of the indicator button 160 under the influence of a steadily increasing differential pressure applied to the differential pressure indicator 10 is not smooth, but has definite steps corresponding to the number of teeth provided on the latch pins 94 and 96.

Once the axial travel of the piston 90 is sufficient to engage the latch pins 94 and 96 with the latch plate 274, it is obvious that the piston 90 cannot return to its original position, even though the differential pressure signal may be removed. Thus, the piston 90 and, correspondingly, the indicator button 160, are locked in a position corresponding to the highest differential pressure achieved during operation. This feature is of particular importance in aircraft application where indicators are only observed during preflight or postflight ground inspection. At this time, hydraulic circuits into which the indicators have been placed are deenergized and actual operating conditions cannot be simulated. However, the differential pressure indicator 10, in accordance with the instant invention, gives positive indication of a dangerous condition.

As best seen in FIG. 5 of the drawings, a latch spring 300 comprises a single coil torsion spring having tangs 302 and 304 at the ends thereof. The tang 302 protrudes radially outwardly and engages in slots 306 and 308 in a retainer member 310 and the housing 50, respectively. The other tang 304 extends radially inwardly and registers in a hole 312 in the side of the end cap 194. The retainer member 310 is held in fixed radial relationship with the housing 50 by a pin 320 and in axial relationship thereto by a retainer ring 312.

The latch plate 274 is permanently secured to the flange 196 on the end cap 194, as by welding. The cap 194 and latch plate 274 are rotatable with respect to the housing 50. The cap 194 and plate 274 are prevented from moving axially outwardly of the housing 50 by a shoulder 324 on the retainer member 310, the angular position of the end cap 194 and latch plate 274 with respect to the housing 50 being maintained by the tangs 302 and 304 of the latch spring 300. The torsional stiffness of the latch spring 300 is such that during all stages of operation, except while unlocking, it is in the position as shown in FIG. 5, i.e., expanded outwardly against the housing 50.

With the differential pressure indicator partially or fully actuated, the button 160 is in an extended position. Once the indicator button 160 shows a signal, the only method of resetting the differential pressure indicator 10 and removing the signals is to disengage the latch pins 94 and 96 from the locking plate 274, thereby permitting the piston 90 to return to the no-indication position.

In order to reset the differential pressure indicator, it is merely necessary to rotate the end cap 194. Although the piston 90 tends to follow rotation of the end cap 194 by reason of the torsional load applied to it through the piston spring 230, it is prevented from following by the abutment of the pin 104 against the side of the piston slot 108. It is therefore seen that upon rotation of the end cap 194, the ratchet pins 94 and 96 are disengaged from the latch plate 274. Once disengagement is achieved, the axial force exerted by the piston spring 230 returns the piston 90 to the position as shown in FIG. 3, and, in so doing, causes the indicator button 160 to be retracted into the housing 50. Once the externally applied torque is removed from the end cap 194, the end cap 194 returns to its normal position as the spring 300 expands back to the full diameter of the housing 50 within which it rests.

The end cap 194 is manually manipulated by means of a "one-way" slot 350 therein, which precludes turning the end cap 194 in the wrong direction.

It can be seen from the above arrangement that once the differential pressure indicator 10 has been actuated, it cannot be reset without either removing it from the filter in which it is installed, or gaining access to the end cap 194 from within the filter 12. This feature necessitates opening the hydraulic circuit as required for servicing prior to accomplishing reset.

To prevent actuation of the differential pressure indicator 10 by a high differential fluid pressure resulting solely from low fluid temperatures, a split bimetallic ring 360 is installed in a complementary annular groove 362 in the housing 50. The ring 360 is completely surrounded by the working fluid and therefore senses working fluid temperature. Calibration of the ring 360 is such that when fluid temperature is above a predetermined value, the ring 360 expands radially outwardly against the inside diameter of the groove 362 in the housing 50, permitting free travel of the piston 90. If, however, fluid temperature is below this preset point, the ring 360 contracts radially inwardly precluding movement of the piston 90. When this condition obtains, no movement of the indicator button 160 will occur, regardless of the differential pressure across the differential pressure indicator 10.

A plurality of axially spaced grooves 370 are provided on the outer periphery of the indicator button 160, to indicate the degree of movement thereof. This important feature clearly indicates the percentage of usable life still left in, for example, a filter element.

It can thus be seen that the above-described differential pressure indicator is one which will provide a graduated linear movement as a function of differential pressure applied to it. Once the differential pressure indicator has been subjected to a differential pressure, it cannot be reset without opening the hydraulic circuit. The differential pressure indicator minimizes the effect of frictional forces on its operation, which forces are constant and independent of uncontrollable variables. No magnetic parts are utilized, and a low temperature lockout eliminates spurious operation at low ambient temperatures.

It is to be understood that the specific construction of the improved differential pressure indicator herein disclosed and described is presented for the purpose of explanation and illustration and is not intended to indicate limits of the invention, the scope of which is defined by the following claims.

What is claimed is:

1. A differential pressure indicator comprising a housing having an aperture therein for communication with a high fluid pressure and an aperture for communication with a relatively lower fluid pressure, a piston movable in longitudinal translation in response to a pressure differential between the apertures in said housing, a shaft threadably coupled to said piston for converting movement thereof into rotation, and a nut threadably coupled to said shaft for converting rotation thereof into translation, said nut giving visual indication of the differential pressure existing between the apertures of said housing.

2. A differential pressure indicator comprising a housing having an aperture therein for communication with a high fluid pressure and an aperture for communication with a relatively lower fluid pressure, a piston disposed between the apertures in said housing and movable in longitudinal translation in response to a pressure differential between the apertures in said housing, a shaft threadably coupled to said piston for converting movement thereof into rotation and having a radial flange thereon, a nut threadably coupled to said shaft for converting rotation thereof into translation, said nut giving visual indication of the differential pressure existing between the apertures of said housing, and means for sealing the high pressure side of said piston from the low pressure side thereof comprising a sleeve rotatably disposed about said shaft having a radial flange thereon, and a flat radially extending seal disposed about said shaft and between the flanges on said shaft and sleeve, respectively.

3. A differential pressure indicator for a fluid system comprising a housing having an aperture therein for communication with fluid at a relatively high pressure and an aperture for communication with fluid at a relatively lower pressure, a piston disposed between the apertures in said housing and movable in longitudinal translation from an index position in response to a pressure differential between the apertures in said housing, a shaft threadably coupled to said piston for converting movement thereof into rotation, a nut threadably coupled to said shaft for converting rotation thereof into translation, said nut giving visual indication of the differential pressure existing between the apertures of said housing, means disposed about said shaft for sealing the high pressure side of said piston from the low pressure side thereof, and means for locking said piston against return to said index position comprising a latch plate supported by said housing in axially fixed relation thereto, a latch pin releasably engageable with said latch plate, and means secured to said latch plate accessible from the low pressure side of said indicator for releasing said latch pin from said latch plate.

References Cited in the file of this patent
UNITED STATES PATENTS

| | | |
|---|---|---|
| 1,683,471 | Kraft | Sept. 4, 1928 |
| 2,673,464 | Zublin | Mar. 30, 1954 |
| 3,090,235 | Houser | May 21, 1963 |

FOREIGN PATENTS

| | | |
|---|---|---|
| 59,596 | Netherlands | Feb. 17, 1940 |